United States Patent

[11] 3,577,151

[72] Inventors Gunther Bogner
Tennenlohe;
Richard Maier, Erlangen, Germany
[21] Appl. No. 812,040
[22] Filed Apr. 1, 1969
[45] Patented May 4, 1971
[73] Assignee Siemens Aktiengesellschaft
Berlin, Germany
[32] Priority Apr. 6, 1968
[33] Germany
[31] P 17 65 132.0

[54] FULLY OR PARTLY STABILIZED CONDUCTOR COMPRISED OF SUPERCONDUCTING AND NORMAL-CONDUCTING METALS
11 Claims, 5 Drawing Figs.

[52] U.S. Cl. .......... 174/128,
174/15, 174/115, 335/216, 336/207
[51] Int. Cl. .......... H01v 11/04,
H01f 7/22
[50] Field of Search .......... 174/128,
(S.C.) 15; 336/207, 250; 335/216; 29/599

[56] References Cited

UNITED STATES PATENTS

| | | | |
|---|---|---|---|
| 3,265,939 | 8/1966 | Rinderer | 335/216 |
| 3,306,972 | 2/1967 | Laverick | 174/(SC) |
| 3,363,207 | 1/1968 | Brechna | 336/250UX |
| 3,366,728 | 1/1968 | Garwin | 174/(SC) |
| 3,453,725 | 7/1969 | Donezan | 174/(SC) |
| 3,465,430 | 9/1969 | Barben | 29/599 |
| 3,474,187 | 10/1969 | Donadieu | 174/128 |

FOREIGN PATENTS

| | | | |
|---|---|---|---|
| 1,357,200 | 2/1964 | France | 174/SC |
| 1,130,464 | 10/1968 | Great Britain | 174/SC |
| 6,716,422 | 6/1968 | Netherlands | 174/SC |

*Primary Examiner*—E.A. Goldberg
*Attorneys*—Curt M. Avery, Arthur E. Wilfond, Herbert L. Lerner and Daniel J. Tick

ABSTRACT: Described is a fully or partly stabilized conductor combined of superconducting and normal-conducting metals. The conductor is characterized in that several superconductors with small cross section are combined with a copper matrix to form a multicore conductor. The superconductors are completely embedded in the copper matrix and in metallurgical connection therewith. Several multiconductors are enclosed with one aluminum jacket and are electrically and thermally connected with the same.

FULLY OR PARTLY STABILIZED CONDUCTOR COMPRISED OF SUPERCONDUCTING AND NORMAL-CONDUCTING METALS

The invention relates to a fully or partly stabilized conductor comprised of superconducting and normal-conducting metals.

High-field superconductors, for example for a current flow of 1000 to 10,000 A, can be produced by the known production methods in relatively short lengths only, due to their great weight. Therefore, for large superconducting units, such as magnets of a large bubble chamber, the conductor must be comprised of many individual pieces. The superconducting unit thus contain a plurality of ohmic contacts which produce considerable losses, during operation at high currents. Also, as a rule, the forces on the junction points are unevenly distributed and the resultant force components can cause a destruction of the superconducting unit at these junction points.

Combined conductors had been suggested wherein superconducting round wires, provided with a copper coating, are wound around a steel core and a plurality of said structural units are stored in an aluminum housing. Hollow spaces, however, between the superconducting wires cannot be avoided. Therefore, the surface of the superconducting round wires is only partly stored, at most only one-half, inside the aluminum housing. The thermal and electrical contact between the superconducting wires and the aluminum is accordingly poor. This results in considerable ohmic losses, for example at welding spots produced for elongating the high-field superconductor. Moreover, the steel core is not connected with the superconducting round wires and the entire construction is unstable, for example to temperature changes. This high-field superconductor is therefore also unsuitable for the construction of large, superconducting units.

The object of this invention is to construct a combination conductor with satisfactory qualities from the mechanical, electrical and magnetic point of view. We achieve this object by combining several superconducting conductors having small cross sections with a copper matrix, to form a multiple-core conductor, whereby the superconducting conductors are completely embedded in the copper matrix and metallurgically connected therewith, and enclosing several multicore conductors with an aluminum housing, with which they are connected in electrical and thermal conductance.

Preferably, the multicore conductors are metallurgically connected to their surrounding aluminum housing. A metallic intermediate layer can be provided between each multicore conductor and the aluminum housing. This metallic interlayer is thin relative to the superconducting conductors and has a melting point lower than that of copper or aluminum.

The combined conductor according to the invention has the advantage, compared to the previously used conductors, that it affords between the superconductors and the normal-conducting aluminum a contact which is uniformly distributed over the entire cross section. Since no hollow spaces are present, the mechanical conditions are clearly defined and the contact surface between the superconductor and the normal-conducting metal corresponds completely to the superconductor surface.

The combined conductor can be reinforced by at least one steel insert which runs parallel to the multicore conductors and which is enclosed by the aluminum housing.

When the multisuperconductors are not available with the required length, normal-conducting welding spots can be provided at the multicore conductors which are completely enclosed by the aluminum jacket. The distance between two successive welding spots of different or of the same multicore conductor is a multiple of the width of a combined conductor.

This technique of the graduated, displaced connection at the multicore conductors has optimum electrical and mechanical features. The commutation of the current from the superconductor into the normal-conducting metal and vice versa, is effected across an extremely large conductor cross section and, thus, the contact resistance is very small and the losses can be neglected. In addition, due to the mutual displacement of the welding points, the losses occur in a great volume and the heat removal is extremely satisfactory. Since the welding connection of the multicore conductors takes place prior to the wrapping with the aluminum jacket, the welding spots are not visible on the surface and the shape of the conductor is maintained in the region of each welding point. Because of this contacting technique, the conductor which is assembled according to the invention can be continuously produced with almost any cross section and any desired length, whereby problems at contact points are virtually absent.

In the following, the conductor composed in accordance with the invention and its employment in a magnetic coil will be described in greater detail, with reference to the drawing in which.

Figures 1, 2, 3, 4:
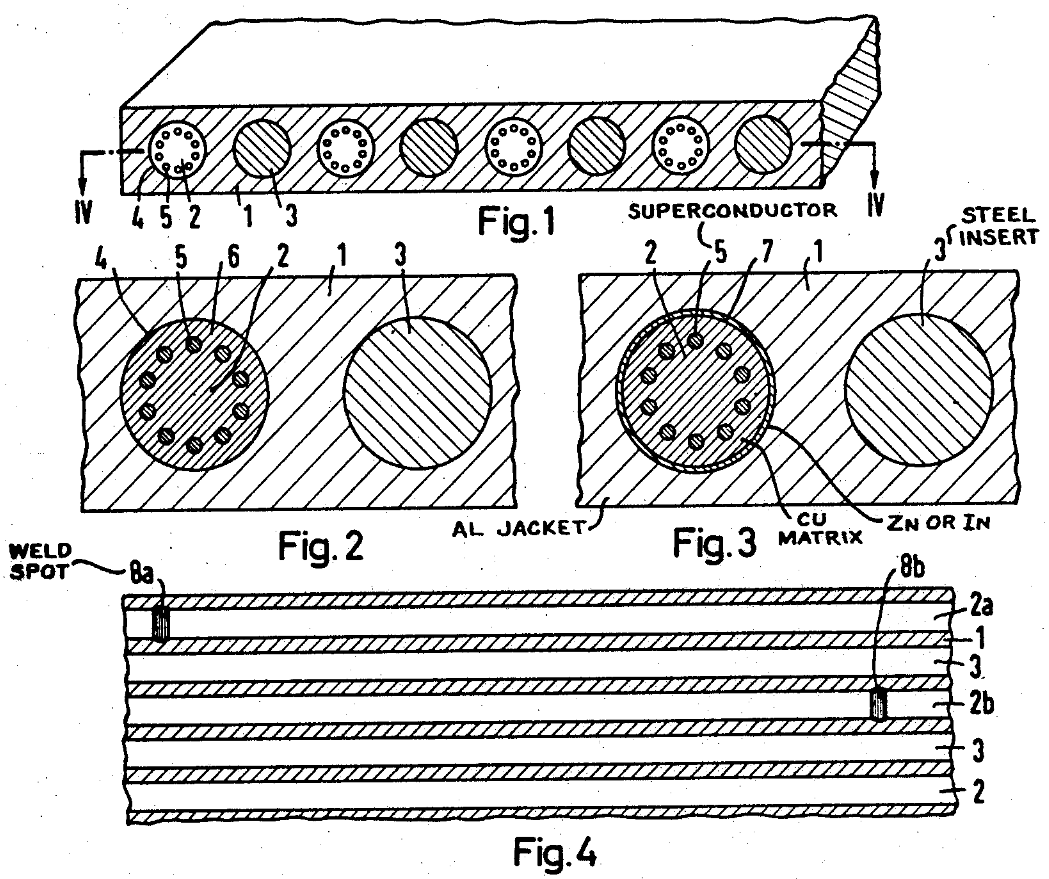
FIG. 1 shows a sectional view of a superconductor prepared according to the invention.
FIG. 2 shows an enlarged section of FIG. 1.
FIG. 3 shows a possible alternate to FIG. 2.
FIG. 4 shows a partial section along IV–IV of FIG. 1.

FIG. 1 shows a partial view of a conductor prepared according to the invention. Multicore conductors 2 and steel inserts 3 parallel to said multicore conductors are embedded into aluminum jacket 1. The additional reinforcement with the steel inserts 3 is provided for cases where the mechanical stability of the combined conductor is no longer adequate to cope with the occurring forces. The total cross section of the steel content is between 2 to 20 percent, relative to the total cross section of the combined conductor.

The multicore conductors run, at least substantially, parallel to each other in the aluminum housing 1. The contact between the multicore conductors 2 and the aluminum housing 1 is preferably metallurgically effected. Thus, if the cross section of the aluminum is appropriately dimensioned, the aluminum housing can contribute considerably to the electrical stabilization.

The contact between the multicore conductors 2 with the aluminum 1 can be effected by an extrusion process. The extrusion temperature should be so adjusted that an alloyed region 4 occurs between the copper matrix of the multicore conductor and the extruded aluminum. The most favorable extrusion temperature is 448° C and should be maintained at this value for 10 to 30 seconds. If the time and the temperature during extrusion do not suffice for forming an aluminum/copper eutectic at a layer thickness of approximately $1\mu$, subsequent tempering may be effected for 10 to 60 minutes, at a temperature of approximately 300 to 400° C.

The contact between the multicore conductor 2 and the aluminum 1 can also be effected by ultrasonic welding. This should always be followed by a subsequent tempering for 10 to 60 minutes, at a temperature of 300 to 400 C, which simultaneously optimizes the low temperature resistance of the aluminum.

FIG. 2 shows an enlarged section of the combined conductor according to FIG. 1. FIG. 2 shows details of the multicore conductor 2 wherein superconductors 5 are preferably distributed at least approximately symmetrically across the cross section of the multiconductor. The material of the superconductors 5 can, for example, constitute a niobium/titanium alloy. The superconductors 5 are in metallurgical connection with the copper matrix 6. The multicore conductors 2 can be round or even rectangular. The FIG. shows that the contact surface 4 between the stabilized superconductor 2 and the normal-conducting metal corresponds completely to the surface of the superconductor and that no hollow spaces exist. The thermal and electrical conductance properties of the contact surface 4 are therefore optimal and, as previously indicated, the aluminum can contribute toward the stabilization of the combined conductor when the cross section of the multicore conductor 2 is not adequate for this purpose.

FIG. 3 also shows an alternate section of the conductor, wherein the contact between the multicore conductor 2 and the enclosing aluminum jacket 1 is modified. An intermediate layer 7 comprised of a metal, whose melting point is lower than the melting point of the aluminum and the copper, is seen. The thickness of the metallic intermediate layer amounts to less than 1$\mu$. The intermediate layer 7 is placed upon the multicore conductors 2, either by electrolysis or by an immersion process.

These types of metallic intermediate layers 7 should be provided whenever a heat treatment, due to the vulnerability of the employed superconducting alloys, at temperatures of 300 to 400° C is impossible over long periods of time. This may be the case also with NbTi alloys. Indium or zinc is preferable for the intermediate layers 7. With these materials, a heat processing of the finished high-field superconductor is effected at approximately 400° C over a period of about 1 minute, which results in a good electrically and mechanically stable connection between the copper matrix of the multicore conductor 2 and the aluminum housing 1. This heat processing simultaneously results in an optimization of the low temperature resistance of the stabilized metal.

FIG. 4 illustrates a partial view of a section along line IV–IV of FIG. 1. This FIG. shows the contacting technique for multicore conductors which should be particularly used when the multicore conductor has a relatively large cross section and when the production lengths of the multicore conductor 2 are less than that required for the combined conductor. For elongation purposes, the multicore conductors 2 are welded together and the weld spots 8 in the combined conductor are located far apart relative to each other. Preferably, the distance between two successive welding spots 8*a* and 8*b* of the multicore conductors 2*a* and 2*b* amounts to approximately 10m. The weld sports, which can be produced by cold welding or by resistance welding, are completely enclosed by the aluminum housing 1. This, the connections between the multicore conductors 2 are not visible from the outside, which fulfills an important prerequisite, i.e. the maintenance of the geometrical shape of the conductor. To increase the good electrical qualities of the connections, the weld spots of the multicore conductors must locally be far displaced relative to one another. This technique permits the production of quasicontinuous, fully stabilized, high-field superconductors.

Figure 5:
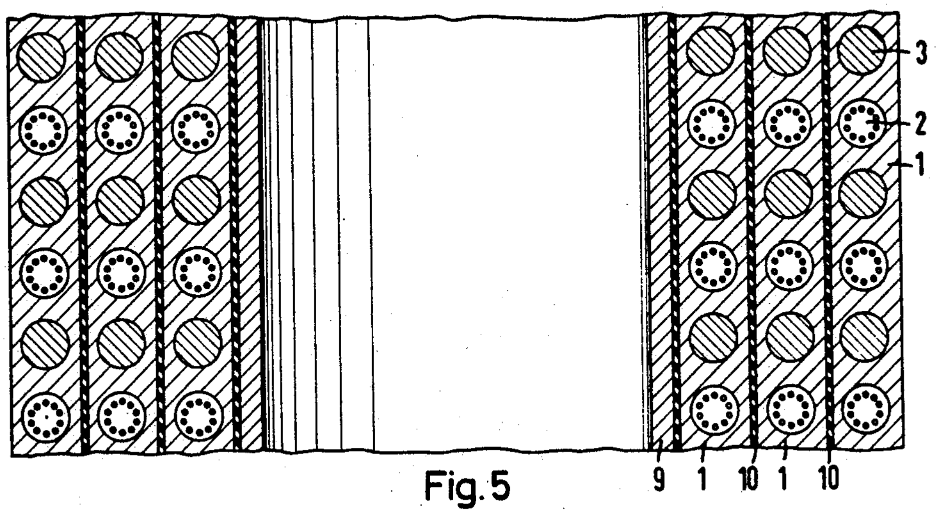
FIG. 5 shows a section of a magnetic coil whose winding comprises a superconductor according to the invention.

FIG. 5 shows a section of a magnetic coil, for whose winding we use the combined conductor according to the invention. Three windings are placed upon the coil body 9. Between the individual windings of the combined conductor and between the combined conductor and the coil body 9, are cooling paths 10, which can be comprised of a synthetic material such as Hostaflon or glass fiber/epoxide resin or a hard texture, in order to ensure a good cooling for the magnetic coil. The steel inserts 3 reinforce the mechanical stability of the magnetic coil. If this reinforcement is insufficient for absorbing the tensile stress which occurs in the magnet, additional reinforcement can be provided for the combined conductor in the form of a steel band wound in parallel therewith. This is not separately shown in FIG. 1.

It is pointed out that the disclosed multicore conductors are not limited to the use of NbTi alloys for the superconductors. For example, $Nb_3Sn$ layer conductors with a coating of silver can also be used.

We claim:

1. Fully or partly stabilized conductor combined of superconductive metals, copper and aluminum, wherein several superconductors with small cross sections are combined with a copper matrix to form a multicore conductor, said superconductors are completely embedded in the copper matrix, several multiconductors are enclosed by a single aluminum jacket and are electrically and thermally connected therewith, said multicore conductors being in connection with their enclosing aluminum jacket via an alloy region.

2. The combined conductor of claim 1, wherein the superconductors are approximately symmetrically distributed over the cross section of the multicore conductor.

3. The combined conductor of claim 1, wherein the superconductor is a niobium/titanium alloy.

4. The combined conductor of claim 1, wherein the multicore conductors run approximately parallel in the aluminum housing.

5. Fully or partly stabilized conductor combined of superconductive metals, copper and aluminum, wherein several superconductors with small cross sections are combined with a copper matrix to form a multicore conductor, said superconductors are completely embedded in the copper matrix, several multiconductors are enclosed by a single aluminum jacket and are electrically and thermally connected therewith, and at least one steel insert parallel to the multicore conductors within the aluminum housing.

6. The combined conductor of claim 5, wherein the total cross section of the steel inserts amounts to 2 to 20 percent of the total cross section of the combined conductor.

7. Fully or partly stabilized conductor combined of superconductive metals, copper and aluminum, wherein several superconductors with small cross sections are combined with a copper matrix to form a multicore conductor, said superconductors are completely embedded in the copper matrix, several multiconductors are enclosed by a single aluminum jacket and are electrically and thermally connected therewith, and a metallic intermediate layer, whose melting point is lower than the melting point of copper or aluminum is provided between each multicore conductor and the aluminum housing.

8. The combined conductor of claim 7, wherein indium is the intermediate layer.

9. The combined conductor of claim 7, wherein zinc is the intermediate layer.

10. Fully or partly stabilized conductor combined of superconductive metals, copper and aluminum, wherein several superconductors with small cross sections are combined with a copper matrix to form a multicore conductor, said superconductors are completely embedded in the copper matrix, several multiconductors are enclosed by a single aluminum jacket and are electrically and thermally connected therewith, lengths of superconductive metal are joined together by normal conducting weld spots to provide a longer length of wire, said normal conducting weld spots are completely enclosed by an aluminum housing, and the distance between two successive weld spots is a multiple of the width of the combined conductor.

11. The combined conductor of claim 10, wherein the distance between two successive weld spots is approximately 10 m.